Figure 1:
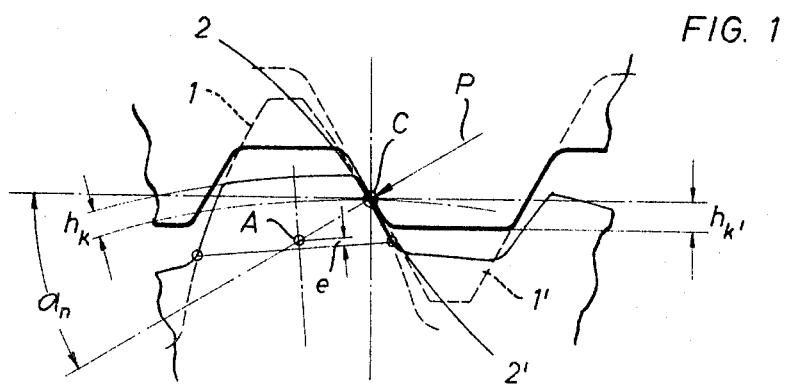

Aug. 30, 1966

G. NIEMANN 3,269,205

HELICAL GEAR TOOTH STRUCTURE

Filed Dec. 31, 1963

United States Patent Office 3,269,205
Patented August 30, 1966

3,269,205
HELICAL GEAR TOOTH STRUCTURE
Gustav Niemann, Flemingstrasse 39, Munich 27, Germany
Filed Dec. 31, 1963, Ser. No. 334,873
Claims priority, application Germany, Jan. 2, 1963,
N 22,559
6 Claims. (Cl. 74—458)

The present invention relates to gears.

In particular, the present invention relates to helical gears the teeth of which may extend along a helix and appear straight or the teeth of which may be curved along an arc, and in which the engagement of the teeth moves parallel to the longitudinal extension of the teeth along the tooth flanks, and the gearing has an overlap or face contact ratio which is greater than 1.

The invention is applicable not only to spur gears but also to bevel gears and in fact to combinations of gearing such as a pinion and rack.

Gear structures of the above type are well known, and one known structure of the above type is disclosed in U.S. Patent 1,601,750. The gearing disclosed in this latter patent is known today as Novikov gearing, and according to the structure shown in this patent the teeth of a pair of mating gears are located entirely beyond the pitch circle in the case of one gear and entirely inside the pitch circle in the case of the other gear, and in the particular example illustrated in the patent the teeth have the profiles of circular arcs where the center of the radius of curvature for each tooth profile is theoretically in the pitch circle of the particular gear. As a result, these gears do not have an angle of action made up of a conventional angle of approach and angle of recess. Instead the teeth engage each other only after they have moved beyond the pitch point. When the teeth of a pair of such gears engage each other they engage each other for a short period of time over profiles which mate with each other and which have a common curvature, and of course in order to maintain the teeth of such gears in engagement it is necessary to provide helical gears so that the area of contact will progress longitudinally along the teeth during rotation of the gears. The helix angle or the angular displacement between the ends of each tooth at the opposed end faces of such a gear is greater than the circular pitch, so that there is no possibility that the teeth of a pair of meshing gears of this type will ever be out of mesh.

The great difficulty with gears of this type resides with the fact that at the moment of contact between the teeth of a pair of mating gears the contacting profiles of a pair of teeth are turning one relative to the other about the pitch point, with the result that there is an unavoidable sliding or rubbing of the tooth surfaces with respect to each other.

It is accordingly a primary object of the present invention to provide gearing of the general type discussed above but wherein there is practically no rubbing or sliding between the engaging teeth of a pair of gears of the above type, and it is again emphasized that when reference is made to a pair of gears, this reference is intended to include not only spur gears or bevel gears but also a pinion and rack combination.

In general, it is also among the objects of the invention to provide gears with teeth which not only will have very little frictional rubbing with respect to each other but which also will be simple to manufacture while at the same time being very rugged and strong in operation and requiring very little if any maintenance and being capable of use in a very wide variety of applications with constructions simpler than those which have heretofore been required.

The principal feature of the present invention resides in providing for gears of the above general type a tooth profile which in each plane parallel to the end faces will limit the area of contact between the tooth of one gear with a tooth of a mating gear substantially to the pitch point, so that in this way there is practically no frictional rubbing or sliding of the teeth of a pair of meshing gears having the structure of the invention.

The invention can be carried out with all kinds of tooth profiles, but the most simple and therefore preferred embodiment of the invention provides for a tooth profile which is derived from the standard involute gearing.

Figure 2:
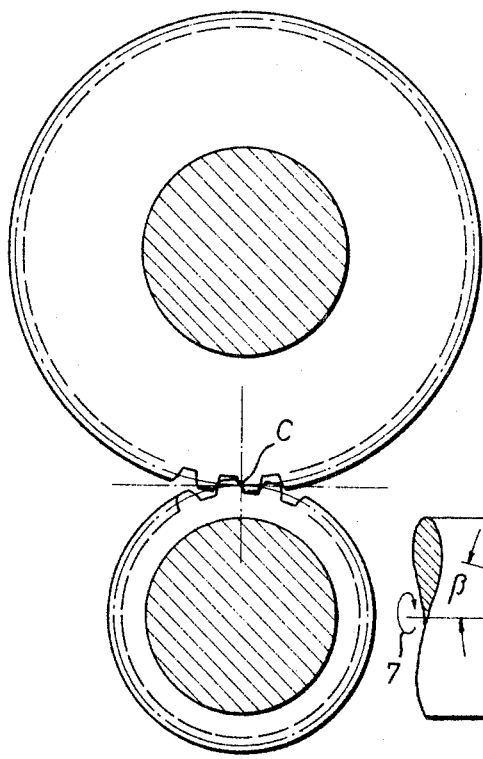
Figure 3:
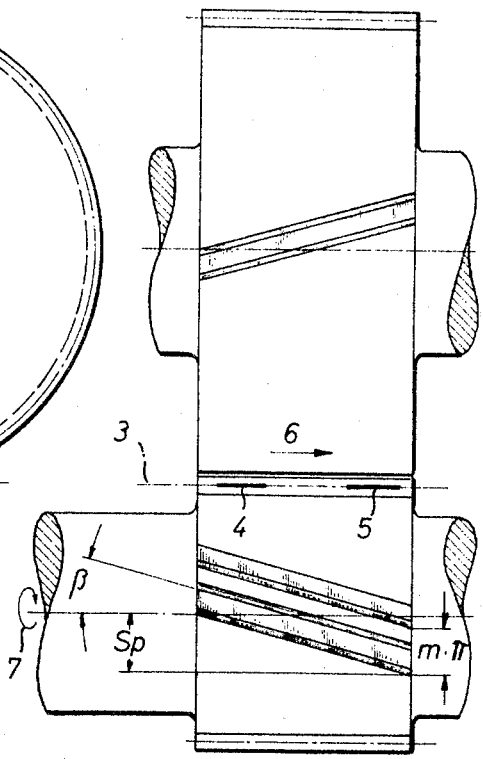

The preferred embodiment of the invention is described in greater detail below in connection with the accompanying drawing which forms part of this application and in which:

FIG. 1 fragmentarily illustrates the cooperation between a pinion and rack which have teeth constructed according to the present invention;

FIG. 2 is an end view of a pinion and gear according to the present invention; and FIG. 3 is a side view of the gears of FIG. 2, FIGS. 1 and 3 illustrating the characteristics of the teeth in addition to the configurations of the teeth themselves.

Referring to FIG. 1, there are fragmentarily illustrated therein a rack and a pinion with the rack shown above the pinion, and for the purpose of illustrating the manner in which the invention operates the pinion may be considered as rotating in a clockwise direction, as viewed in FIG. 1, so as to move the rack to the right, as viewed in FIG. 1, although it is of course to be understood that the same principles would apply where the rack of FIG. 1 moves to the left, as viewed in FIG. 1 and turns the pinion in a counter-clockwise direction. The teeth of the rack and pinion shown in FIG. 1 have a pressure angle or angle of action of approximately 30°, and the profiles of conventional 30° involute gear teeth are illustrated in dotted lines, a conventional involute gear tooth 1 being illustrated for the lower gear or pinion while a conventional involute tooth 1' is shown in dotted lines for the rack. These involute teeth of conventional profile, which conform to standards well known in the art, have the usual addenda, and the addendum is in each case equal to the module $m$ which, as is well known, is equal to the ratio between the diameter and the number of teeth.

In contrast with this conventional construction, which is included in FIG. 1 for the purpose of clearly illustrating and disclosing the preferred embodiment of the present invention, the profile of a gear tooth according to the invention recedes gradually from the pitch circle to the addendum circle with respect to the profile of a conventional involute tooth. Thus, beginning from the pitch point C shown in FIG. 1 it will be seen that the upper line 2 recedes gradually with respect to the involute profile of the tooth 1 and forms the profile for the gear tooth of the invention, and in the same way it will be noted that the gear tooth of the rack has a profile conforming to the line 2' which recedes gradually from the pitch circle to the addendum circle of the rack with respect to the dotted-line profile of the conventional involute tooth 1'.

Moreover, it will be seen that the addenda $hk$ for the gear tooth and $h'k$ for the rack are reduced to about a quarter of the module. Although the reduction to about a quarter of the module for the addendum of each tooth of a gearing according to the invention is illustrated in FIG. 1, in accordance with the invention the extent to which the addendum of a gear tooth may be reduced may range approximately from 0.25 to 0.5 times the module.

The contacting surfaces of gear teeth having this construction have an area of contact which is limited substantially to the pitch point C. The force P which is transmitted at the pitch point intersects the central line of the profile of each tooth at the point A, and it will be seen from FIG. 1 that this point A is spaced from the section through the root of the tooth by an extremely small distance $e$, so that a tooth of a gear according to the invention is subjected to practically no bending stresses and therefore only shearing stresses need be taken into consideration.

Referring to FIG. 3, as well as FIG. 2 which shows the structure of FIG. 3 in an end view, it will be seen that there are illustrated a pair of helical spur gears where each tooth has a helix angle $\beta$ which is equal to 14°, and it will be seen from FIG. 3 that the angular displacement of the ends of the teeth at one end of each gear with respect to the ends of the teeth at the other end of the gear, i.e. the overlap length or face advance, is indicated at $Sp$. The circular pitch is indicated at $m.\pi$ and it is particularly to be noted that the ratio E of $Sp$ to $m\pi$, i.e. the overlap ratio, is greater than 1, so that at all times there will be at least one pair of teeth which mesh with each other, and of course the area of contact between a pair of teeth progresses longitudinally along each tooth from one end thereof to the other during rotation of the gears. The line 3 in FIG. 3 indicates the line along which the area of contact between a pair of teeth progresses during rotation of the gears, and as was indicated above this area of contact will with the structure of the invention be limited substantially to the pitch point at all times, and there are illustrated at 4 and 5 a pair of momentary pressure ellipses which represent the actual areas where the force is transmitted from the pinion to the gear. It will be noted that each elliptical area has a major axis much greater than its minor axis and extending substantially parallel to the line 3 so that the area of contact is indeed limited substantially to the pitch point which progresses along the line 3 for each tooth during rotation of the gears. Thus, when the pinion, illustrated at the lower part of FIGS. 2 and 3, turns in the direction of the arrow 7 shown in FIG. 3 the area of contact 4 or 5 progresses in the direction of the arrow 6 along each tooth. While 5 represents the area of contact between one pair of teeth, of course 4 represents the area of contact between the following pair of teeth.

Thus, with the structure of the invention the contact between a pair of teeth is limited substantially to the pitch point, and the force is transferred from one gear to another over at least one elongated relatively small elliptical area the major axis of which extends substantially longitudinally of the gear tooth, and the ratio of the major axis to the minor axis of the elliptical force-transferring area will be greater as the helix angle is smaller or as the load is greater, so that either with smaller helix angles or with increasing loads the major axis of the elliptical force-transferring area becomes greater with respect to the minor axis.

Inasmuch as the teeth contact each other substantially only at the pitch point there is practically no rubbing or sliding of the teeth with the result that the loss of power with the teeth of the invention is only a fraction of that which is encountered with known teeth, such as those of the type discussed above.

Furthermore, a significant advantage of the invention resides in the fact that relatively small errors in the directions in which the tooth flanks extend, in the distance between the axes of a pair of gears, or in the profiles of the teeth have practically no effect on the stress of the teeth.

Inasmuch as there is practically no rubbing or sliding of the gear teeth of the invention, it is possible, if the teeth are manufactured of stainless steel or nitrided steel, to operate the gears of the invention without any liquid lubricants or grease. As a result of eliminating the requirement of liquid lubricants, the load-carrying capacity of the gearing is substantially greater because pitting of the teeth only occurs because of the presence of liquids; and since it is possible to do away with such liquids, pitting will not occur. Moreover, the gears of the invention can be rotated at extremely high speeds, actually as high as desirable, without any possibility of scuffing of the gears. Because of the very great reduction in the loss of power from rubbing or sliding of the gear teeth, it is possible to transmit large forces without, however, requiring any cooling means to carry away the heat as is required in conventional assemblies for transmitting large amounts of power.

Since lubrication is unnecessary, the gearing of the invention needs no maintenance, and this consideration is of great importance for devices which are used in the home, for example. Furthermore, because of the elimination of liquid lubricants it is possible to operate the gearing at extremely high temperatures, for example, greater than 400° C., and also at relatively low temperatures, such as, for example, less than 60° C., and also it is possible to operate the gears in a vacuum. These considerations are of great advantage when the gearing is used for rockets and satellites and when it is used for drives in atomic energy installations as well as in chemical industries where there is always the danger in certain cases that the lubricant will become decomposed because of radiation or chemical reactions.

On the other hand, in those cases where it has heretofore been required to operate conventional involute gearing with special oils which required additives in order to increase the load carrying capacity of the teeth, it is possible with the gearing of the invention to obtain the same results with conventional oil which does not require any additives.

Because of the extremely small loss of power of the gearing of the invention, this gearing is particularly suitable for controlling, regulating, and measuring devices.

In order to maintain as large as possible a radius of curvature for the profile of the teeth of the invention at the pitch point, and thus maintain the Hertzian pressure, i.e. the contact pressure, between the teeth at a minimum, it is preferable to provide the gears of the invention with tooth profiles providing a pressure angle or an angle of action which is relatively large, on the order of approximately between 25° and 35° in the normal section.

The area of contact between a pair of teeth is limited substantially to the pitch point, as was indicated above, and this feature renders it possible to provide for a gear tooth an addendum which has a ratio to the module of approximately between 0.25 and 0.5. With such extremely short teeth and the relatively large angle of action referred to above, the bending stresses to which the teeth are subjected become negligible, as was pointed out above in connection with FIG. 1, so that only shearing stresses need be taken into consideration.

A particular characteristic of the teeth of the invention, in contrast to conventional involute profiles or the teeth of the Novikov type referred to above in connection with U.S. Patent 1,601,750, is that by increasing the number of teeth, which is to say reducing the module, without changing the principal dimensions such as the diameter, the face width, and the helix angle, the flank load-carrying capacity is increased, while the root load-carrying capacity or the resistance against bending stress of each tooth remains practically constant. It is therefore possible to compensate to a large extent for the reduction in the flank load-carrying capacity, which follows from the reduction in the area of contact substantially to the line 3, as indicated in FIG. 3, by reducing the module and thus increasing the number of simultaneously occurring areas of contact between the teeth. In other words, with the structure of the invention there is a tendency for the load-carrying capacity of the gears to become reduced because of the reduction in the area of contact which is limited substantially to the line 3 of the pitch points, and this latter apparent disadvantage can be substantially reduced in the manner described above by increasing the number of teeth and thus providing more areas of contact for a given gearing.

Furthermore, the relatively small addendum for each tooth makes it possible to provide for a pinion, which is to say a gear of relatively small diameter, a shaft of a larger diameter than would be possible with the standard profile, so that the shaft for a pinion having the structure of the invention can be much stiffer than the shaft of a pinion having the standard profile.

When the invention is used in differential gearing, the small addendum makes possible a smaller difference between the number of teeth of the sun gears so that the transmission ratio can be increased. This is especially the case with differential gearing having sun gears in the form of internal ring gears. Moreover, where a differential gearing has a relatively large tranmission ratio, the application of the invention provides for a larger output for the same input because the output depends for the most part on the extent of loss of power within the gearing.

It is to be noted that the gear teeth of the preferred embodiment of the invention are relatively simple to manufacture since from the root circle to the pitch circle their profile corresponds to a conventional involute profile and the new profile of the invention is provided by relieving the surface of the tooth from the pitch circle toward the addendum circle to an increasing degree with respect to the conventional involute profile as described above.

What is claimed is:

1. A gear having a pair of opposed end faces and having teeth the ends of which at one of said end faces are angularly displaced with respect to the ends of the teeth at the other of the end faces by an angular distance which is greater than the circular pitch of the gear, and each tooth of said gear having with a mating tooth of another gear, an area of contact which advances longitudinally along each tooth from one end thereof to the other end thereof during rotation of the gear, and the profile of each tooth limiting the area of contact between each tooth and a tooth of a mating gear in each plane parallel to the end faces substantially to the pitch point.

2. A gear having a pair of opposed end faces and a plurality of teeth extending between said end faces with the ends of the teeth at one of said end faces angularly displaced with respect to the ends of the teeth at the other of said end faces by an angular distance which is greater than the circular pitch, said teeth having profiles providing an angle of action which is approximately between 25° and 35°, and the teeth of said gear each having with a tooth of a mating gear an area of contact which moves longitudinally along each tooth during rotation of said gear, the profile of each tooth limiting said area of contact in each plane parallel to the end faces substantially to the pitch point.

3. A gear having a pair of opposed end faces and a plurality of teeth extending between said end faces and each having an end at one of said end faces which is angularly displaced with respect to its end at the other of said end faces by an angular distance which is greater than the circular pitch, each tooth having an area of contact with a mating tooth which advances longitudinally along each tooth from one end thereof to the other during rotation of said gear and the profile of each tooth limiting the area of contact in each plane parallel to the end faces substantially to the pitch point, and each tooth of said gear having an addendum which is approximately between 0.25 and 0.5 times the module of said gear.

4. A gear having a pair of opposed end faces and a plurality of teeth extending between said end faces and each having an end at one of said end faces which is angularly displaced with respect to its end at the other of said end faces by an angular distance which is greater than the circular pitch, each tooth having an area of contact with a mating tooth which advances longitudinally along each tooth from one end thereof to the other during rotation of said gear and the profile of each tooth limiting the area of contact in each plane parallel to the end faces substantially to the pitch point, and each tooth of said gear having an addendum which is approximately between 0.25 and 0.5 times the module of said gear, said profile of the teeth having an angle of action of approximately between 25° and 35°.

5. A gear having a pair of opposed end faces and a plurality of teeth respectively having ends at one of said end faces which are angularly displaced with respect to the ends of said teeth at the other of said end faces by an angular distance greater than the circular pitch, and each tooth having an area of contact with a tooth of a mating gear, during rotation of the gears, which moves longitudinally along each tooth from one end to the other end thereof and the profile of each tooth limiting said area of contact in each plane parallel to the end faces substantially to the pitch point, said profile of each tooth receding gradually from the pitch circle to the addendum circle with respect to a conventional involute tooth profile.

6. A helical gear having a pair of opposed end faces and teeth extending between said end faces and respectively terminating at one of said end faces in ends which are angularly displaced with respect to the ends of said teeth at the other of said end faces by an angular distance which is greater than the circular pitch, said teeth having with the teeth of a mating gear an area of contact which moves longitudinally along each tooth from one end thereof to the other end during rotation of said gears and each tooth having a profile which from the pitch circle to the addendum circle gradually recedes with respect to the profile of a standard involute gear tooth, and the addendum of each tooth being approximately between 0.25 and .05 times the module, and each tooth being subjected during operation of the gear substantially entirely to shearing stresses and to almost no bending stresses.

References Cited by the Examiner

UNITED STATES PATENTS 1,425,144   8/1922   Schmick  _____ 74—462
2,176,956  10/1939   Cook et al. _____ 74—462

DAVID J. WILLIAMOWSKY, *Primary Examiner.*

DON A. WAITE, *Examiner.*

L. H. GERIN, *Assistant Examiner.*

UNITED STATES PATENT OFFICE
CERTIFICATE OF CORRECTION

Patent No. 3,269,205                                       August 30, 1966

Gustav Niemann

It is hereby certified that error appears in the above numbered patent requiring correction and that the said Letters Patent should read as corrected below.

Column 6, line 48, for ".05" read -- 0.5 --.

Signed and sealed this 1st day of August 1967.

(SEAL)
Attest:

EDWARD M. FLETCHER, JR.                        EDWARD J. BRENNER
Attesting Officer                                           Commissioner of Patents